US006595768B1

(12) United States Patent
Hunsaker

(10) Patent No.: US 6,595,768 B1
(45) Date of Patent: Jul. 22, 2003

(54) CONCRETE EDGE STAMP AND METHOD FOR SHAPING A CONCRETE SURFACE

(75) Inventor: Theo R. Hunsaker, Vernon, AZ (US)

(73) Assignee: Concrafter, LLC, Vernon, AZ (US)

( * ) Notice: Subject to any disclaimer, the term of this patent is extended or adjusted under 35 U.S.C. 154(b) by 182 days.

(21) Appl. No.: 09/651,449

(22) Filed: Aug. 30, 2000

(51) Int. Cl.[7] ................................................ B29C 59/02
(52) U.S. Cl. ........................ 425/385; 425/403; 425/470
(58) Field of Search ................................ 425/385, 403, 425/470, 169, 173; 249/53 R

(56) References Cited

U.S. PATENT DOCUMENTS

| | | | | | |
|---|---|---|---|---|---|
| 360,753 | A | * | 4/1887 | Bailey | 425/385 |
| 588,021 | A | | 8/1897 | Short | 425/385 |
| 2,208,883 | A | | 7/1940 | Hall | 404/93 |
| 2,214,211 | A | | 9/1940 | Zeppelin | 404/93 |
| 3,930,740 | A | | 1/1976 | Bowman | 404/93 |
| 4,131,406 | A | | 12/1978 | Fresquez | 425/385 |
| 4,135,840 | A | | 1/1979 | Puccini et al. | 404/93 |
| 4,231,677 | A | | 11/1980 | Roming | 404/89 |
| D282,623 | S | | 2/1986 | Nasvik | D8/45 |
| 4,776,723 | A | | 10/1988 | Brimo | 425/458 |
| 5,005,799 | A | * | 4/1991 | Gallagher | 249/53 R |
| 5,061,172 | A | | 10/1991 | Fennessy, Sr. | 425/385 |
| 5,487,656 | A | | 1/1996 | Kaitanjian | 425/385 |

OTHER PUBLICATIONS

"Matcrete" Product catalog, Precision Stamped Concrete Tools (1992).
"Matcrete, The Ultimate In Concrete Design," Precision Stamped Concrete Tools (1992).
"Paving the way to excellence," Brickform Product Guide (1990).
"Creative Images" product brochure (date unknown).
"Cobble Crete Concrete Texturing Tools," product brochure (date unknown).

* cited by examiner

*Primary Examiner*—Robert Davis
*Assistant Examiner*—Thu Khanh T. Nguyen
(74) *Attorney, Agent, or Firm*—Workman, Nydegger & Seeley

(57) ABSTRACT

A stamp for forming customized designs and decorative edging in concrete surfaces of varying size and shape. The stamp has a smooth contact surface and a ridge that defines a pattern that is imprinted in sufficiently hardened concrete. The tool also has measurement markings and reference points that can be used for positioning the tool in a desired location. The stamp has the property of being able to be placed adjacent to another tool or imprint that is out of horizontal and vertical alignment without interfering with the adjacent tool or imprint. The stamp also has the property of being able to overlap a previous stamp placement without interfering with the imprint formed by the previous stamp placement.

26 Claims, 11 Drawing Sheets

CONCRETE EDGE STAMP AND METHOD FOR SHAPING A CONCRETE SURFACE

BACKGROUND OF THE INVENTION

1. The Field of the Invention

The present invention relates to an improved tool and methods for shaping the surface of a deformable material. More specifically, the present invention relates to a stamp for forming decorative edging and designs in concrete.

2. Prior State of the Art

Tools for forming decorative patterns in concrete are widely used in the industry. Most commonly, surface shaping tools are used for aesthetic purposes. They can be used to shape concrete surfaces to imitate the appearance of other materials such as cobblestone, brick, slate, stone, tile or wood. Surface shaping tools can also be used to form customized designs or to imprint a trademark or insignia. However, shaping tools are also used for more practical purposes, such as for forming safety grooves on stairs and handicap ramps. A variety of concrete surfaces can be altered with surface shaping tools, including sidewalks, driveways, patios, walls, and interior floors.

There are many advantages to altering the appearance of concrete to simulate other material. Generally, the material being simulated is more costly. Thus, by using a surface shaping stamp on concrete, the look of another material is achieved at a much lower cost. Also, concrete creates a very durable and stable surface that can be easily maintained. Additionally, concrete is an effective barrier against undesired upgrowth of vegetation. Other advantages to the use of concrete over other materials will be apparent to one of skill in the art.

The prior art of concrete surface shaping tools can be divided into two general groups. The first includes tools that are used to create repeating and uniform patterns. The second group includes tools that are used to create non-repeating patterns.

One problem with using tools of the type that form repeating patterns is that they must be placed in exact horizontal and vertical alignment to avoid overlapping an adjacent tool or imprint. Creating adequate alignment requires skill, training and additional tools. A second problem with tools of the repeating pattern type is that they cannot be used on small and irregularly shaped areas without forming incomplete or overlapping patterns.

Tools of the second group that form non-repeating patterns are also problematic. An example of such a tool is embodied in U.S. Pat. No. 3,930,740, issued to Bowman. In this patent, random imprints, in the shape of stone corners, are formed into a concrete surface. After forming the imprints, additional grooves must be added to connect the imprints. This method can be very expensive and time consuming because of the time and skill required to form the additional grooves. Additionally, the quality and appearance may vary significantly from one job to the next.

Improvements have been made on this technology by creating tools that can mate with adjoining tools, as embodied in U.S. Pat. No. 4,135,840, issued to Puccini. This patent discloses a tool for printing a random stone pattern having six blades on each of four sides that identically match the blades on the other three sides. This allows subsequent tool placements to be matched up with any adjacent tool or previously formed imprint. However, application of this type of tool also requires specific horizontal and vertical alignment to avoid interfering with adjacent tools and imprints.

Each of the methods described, although less expensive than using authentic materials, can still be costly and time consuming. A more economical method for improving the aesthetics of a concrete surface is to shape only selected portions of the concrete surface. Forming decorative borders and inset designs satisfy this objective. Border designs are designs that run along the edge of a surface and inset designs are designs that are formed away from the edge.

Various techniques are used to create each of these designs. Traditional shaping tools can create inset and border designs that imitate authentic materials. However, traditional tools, for reasons already described, are limited in application to areas of a predetermined or regular shape. Applying these tools also requires professional skill and can therefore be expensive.

A more cost effective method for improving the aesthetics of a concrete surface is to selectively expose concrete aggregate in a manner that will decoratively display a design or border. This can be accomplished by creating an aggregate surface for either the design surface area or the remaining concrete surface area.

There are two general methods for creating an aggregate surface in this fashion. The first involves shaping a design perimeter in a concrete surface and then applying a concrete retardant to the surface of either the design or the remaining concrete surface area. The retardant delays the curing of the treated concrete. A pressure washing procedure can be used later to remove the treated concrete and expose the concrete aggregate.

The second method for creating an aggregate surface requires the pouring of concrete into a selected design area at a different time than the pouring of concrete into the remaining area. One problem with this method is that it requires more total time for the concrete to cure. Another problem is that a special form is required to separate the pours. Forms can be expensive and require a lot of time to build, particularly if they define a complex shape.

Another method recognized to improve the appearance of a concrete surface is to stain defined areas in a manner that will expose decorative designs. This method also requires a defined design perimeter to be formed in the concrete surface. Shaping a design perimeter can be accomplished with any of the traditional shaping tools. However, application of traditional shaping tools requires professional skill and, for reasons already addressed, may be limited to surfaces having a regularly shaped area.

Because of the limitations of the prior art devices, there is currently a need for an improved tool and method for forming designs in the surface of a deformable material. In particular, there is a need for an improved tool and method for forming customized designs and decorative edging in concrete surfaces of varying size and shape in an easy-to-use and inexpensive way.

SUMMARY AND OBJECTS OF THE INVENTION

The present invention provides an improved tool and method for forming customized designs and decorative edging in concrete surfaces of varying sizes and shapes in an easy-to-use and inexpensive way. The tool is a stamp comprising a frame having a smooth contact surface and a continuous ridge positioned along the contact surface. The ridge protrudes out of the contact surface to define a pattern extending between a first reference point and a second reference point. Each reference point is located on an opposite side of the stamp and at the same longitudinal position on the stamp. Because of this, each reference point can be used as a reference for subsequent tool placements.

It is preferable that the sides of the tool comprise measurement markings that can also be used as a reference for stamp placement. It is also preferable that the stamp have at least one handle to facilitate stamp placement and movement.

The shape of the frame can vary, but it is preferred that the frame have a substantially trapezoidal shape so that the stamp can form designs in a surface having an irregular shape without interfering with an adjacent stamp or imprint.

One feature of this invention is that it allows a single stamp to form a design in a concrete surface by forming a single continuous recess consisting of multiple adjoining recesses within a regular or irregularly shaped area.

An additional feature of this invention is that it allows a border or inset design of a variably selectable thickness to be formed in a concrete surface having a regular or irregular shaped area.

A further feature of this invention is that it allows stamps having different patterns to be placed adjacently and interchangeably while forming a design pattern in a concrete surface having a regular or irregular shape.

Another feature of this invention is that it allows two adjoining stamps to be angularly offset within a range of angles to create a single continuous design imprint without overlapping or interfering with the design imprint formed by the alternate stamp.

Yet another feature of this invention is that it allows a design to be formed in the surface of deformable materials other than concrete, such as asphalt and plasters.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The preferred embodiment of the invention relates to a stamp for forming customized designs and decorative edging in concrete surfaces of varying size and shape in an easy-to-use and inexpensive way.

Figure 1:
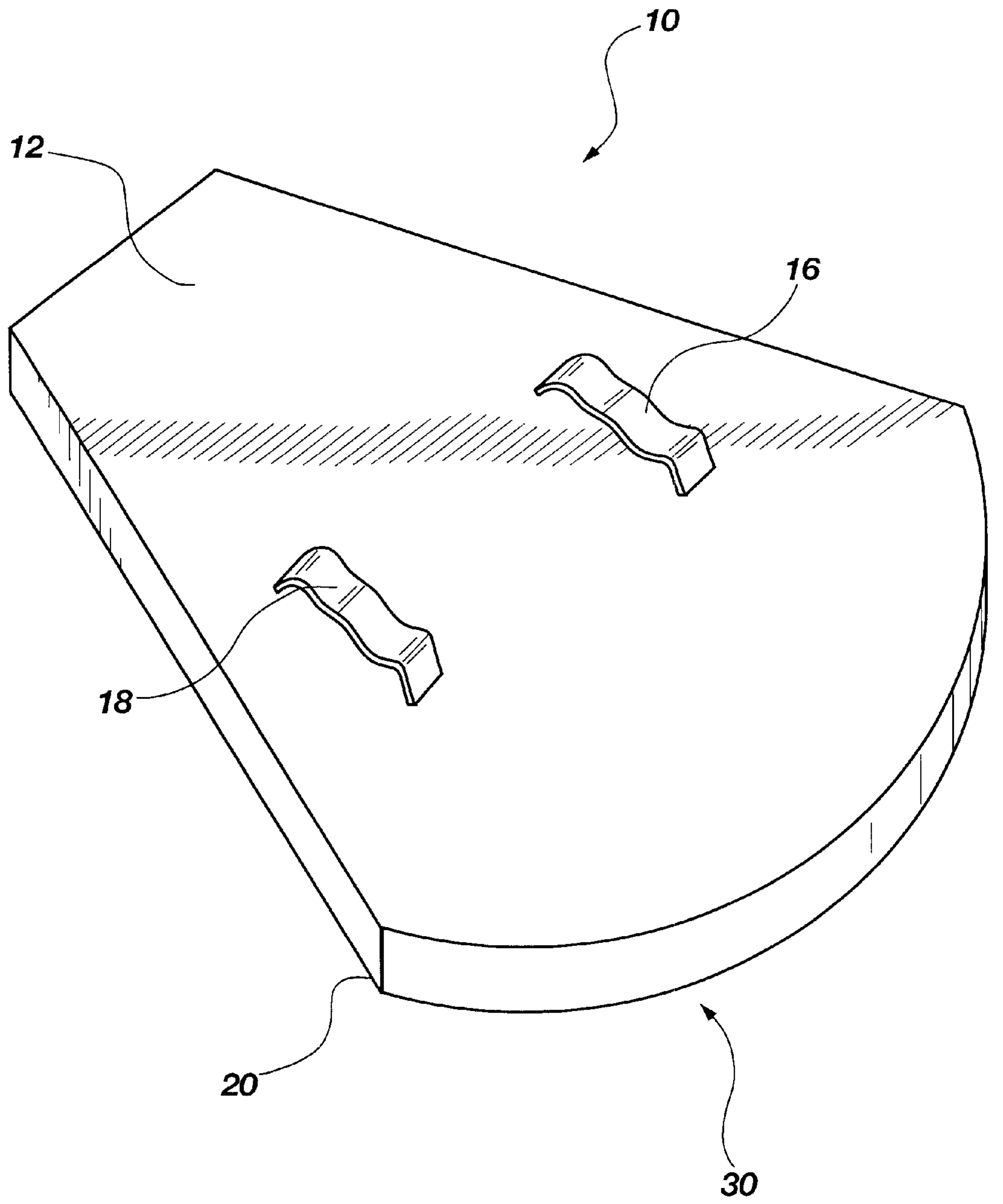
FIG. 1 illustrates a perspective top view of one presently preferred embodiment of the stamp of the present invention.
Figure 2:
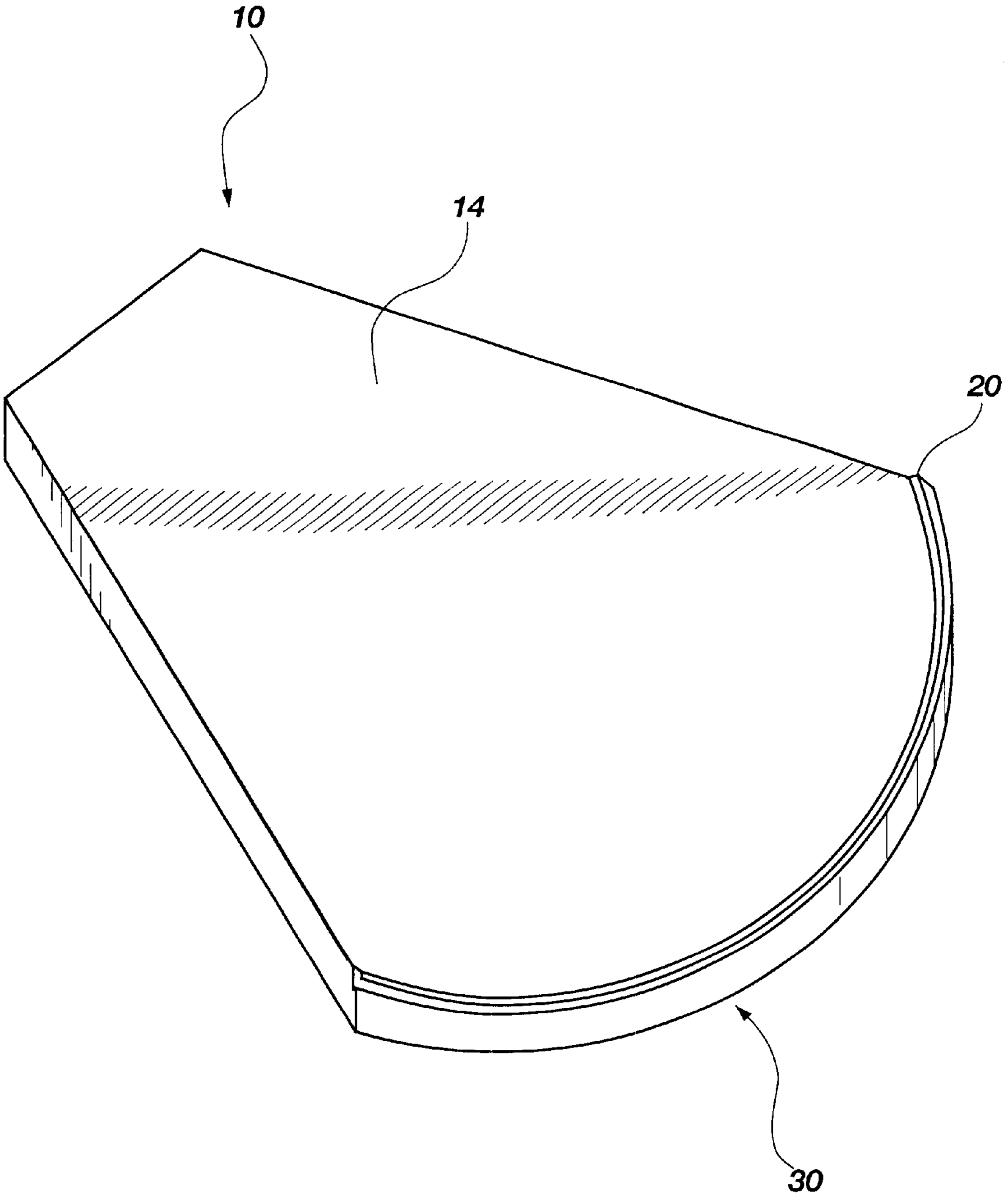
FIG. 2 illustrates a perspective bottom view of one presently preferred embodiment of the stamp of the present invention.
Figure 3:
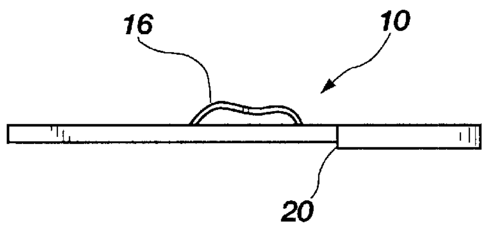
FIG. 3 illustrates a side view of one presently preferred embodiment of the stamp of the present invention.

FIGS. 1–3 illustrate one preferred embodiment of the stamp 10 of the present invention, consisting of a frame 12 a contact surface 14, a ridge 20, and handles 16 and 18. In this preferred embodiment, the contact surface 14 is smooth so it will not alter the shape of a generally smooth concrete surface when it engages the concrete surface. The smooth contact surface 14 allows the stamp 10 to be positioned in a placement that overlaps a previous stamp placement without interfering with the imprint of the previous stamp placement. This is particularly important for forming an inset design in the surface of an irregular shaped area and for forming a decorative border design on an edge that has an internal radius.

In this presently preferred embodiment, the frame 12 is substantially trapezoidal and is approximately 23 inches long, 23 inches wide at the top and 8 inches wide at the base. In another embodiment, the shape of frame 12 is substantially triangular. However, it should be appreciated that the frame 12 can consist of a variety of sizes and shapes to serve specific needs. For example, the frame 12 may be small enough to be held in one hand. This would be particularly useful for forming small delicate designs on a plaster wall surface.

The substantially trapezoidal shape of frame 12 is useful because it allows the stamp 10 to be placed adjacent to another stamp at an angle that is offset from the angle of the adjacent stamp. This unique feature of the present invention will be illustrated and further explained throughout. This feature is particularly useful for forming small inset designs and border designs along a surface having a radius such as a sidewalk.

In the presently preferred embodiment, the handles 16 and 18 facilitate placement and movement of the stamp 10. In this embodiment, the handles 16 and 18 are made out of ordinary nylon straps that are approximately two inches wide and six inches long. However it should be appreciated that the handles 16 and 18 can be a variety of sizes and can be made of any material that is typically used for handles, including, but not limited to rope, fabric, plastic, metal and wood.

One benefit of using nylon straps for handles 16 and 18 is that nylon straps are very flexible. This flexibility allows the handles 16 and 18 to be pressed flat and enables efficient storage of the stamp 10. This is particularly true when several stamps 10 are stacked on top of one another. Another benefit of having flexible handles 16 and 18 is that they are durable and unlikely to break when exposed to direct impact forces. The handles 16 and 18 may often be exposed to direct impact forces in practice, such as when the stamp 10 is struck with a mallet on or around the handles or when the stamp 10 is thrown into the back of a truck.

In this preferred embodiment, each end of the handles 16 and 18 is integrally connected to frame 12 at the time of manufacture when the frame is cast out of rubber. However, in other embodiments, the handles 16 and 18 are detachable fixtures and are connected to the frame 12 in any manner commonly recognized as a means for attaching a handle to a tool, including but not limited to glue, epoxy, screws, rivets, and welding.

With continued reference to FIGS. 1–3, ridge 20 extends outwardly from the contact surface 14. The ridge 20 is continuous and extends from one side of the frame 12 to the other. In one preferred embodiment, the ridge 20 is composed of rubber. Rubber is preferred because it is flexible and durable and can withstand the external forces that are applied to the stamp 10. However, it should be appreciated that other materials, including various plastics can also be used. In fact, the ridge 20 can consist of any material that is suitable for forming recesses in a deformable material.

In the preferred embodiment, the ridge 20 is composed of the same material as the frame 12 and is integrally connected to the frame 12 from the time of manufacture. One way to integrate the ridge 20 with the frame 12 is to cast the frame 12 and the ridge 20 out of a single mold at the same time.

In other embodiments, the ridge 20 is composed of a different material than the frame 12 and may be manufactured independent of the frame 12. For example, the ridge 20 may be placed into a mold prior to casting the frame 12 and the frame 12 may be cast around it. Alternatively, the ridge 20 may be a separate fixture that is detachable and interchangeable with other ridges. Detachable ridges may be attached to the frame with any suitable means for attachment, such as clamps and screws.

The purpose of the ridge 20 is to penetrate the surface of a deformable material and form a recess. Because the ridge 20 defines a pattern 30, the recess formed by the ridge 20 will take the form of the pattern 30. In this manner, the ridge 20 can effectively form a design or design perimeter in the surface of the deformable material in the image of the pattern. It should be appreciated that the pattern 30 defined by the ridge 20 can be any variety or combination of shapes. Accordingly, the ridge 20 may be curvilinear and/or angular.

Figure 4:
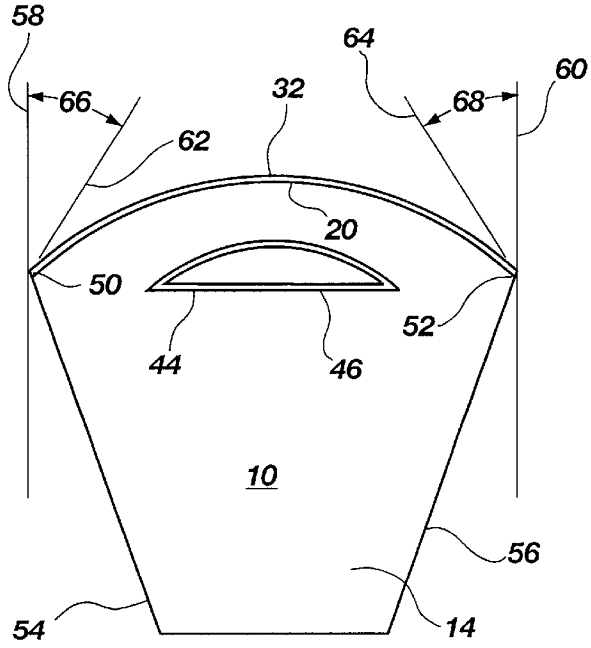
FIG. 4 illustrates a bottom plain view of one embodiment of the stamp of the present invention that includes a half-circle pattern.
Figure 5:
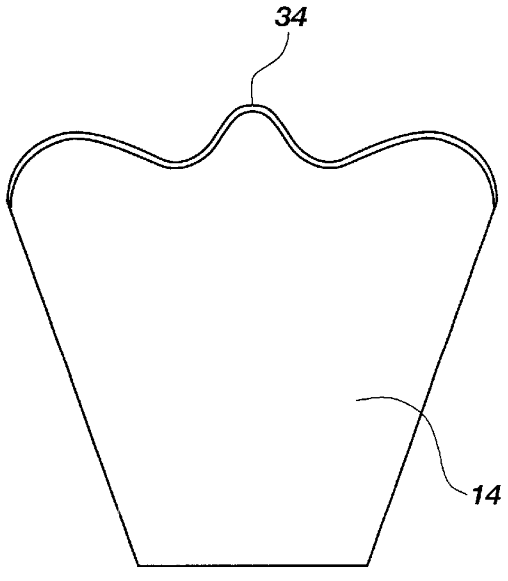
FIG. 5 illustrates a bottom plain view of one embodiment of the stamp of the present invention that includes a pattern having the shape of a grammatical bracket.

FIGS. 4–9 show six pattern variations. FIG. 4 shows one embodiment of the stamp 10 that has a pattern 32 in the shape of a half-circle. FIG. 5 shows another embodiment of the stamp 10 with a pattern 34 that generally resembles a grammatical bracket. Each of these patterns 32 and 34 is useful for forming portions of a design perimeter. Several methods can be used to complete the entire perimeter of a design as will be described later. After a complete design perimeter is formed, the design can be left as is or enhanced such as with a color stain or a contrasting aggregate surface within the design area or outside of the design area.

Figure 6:
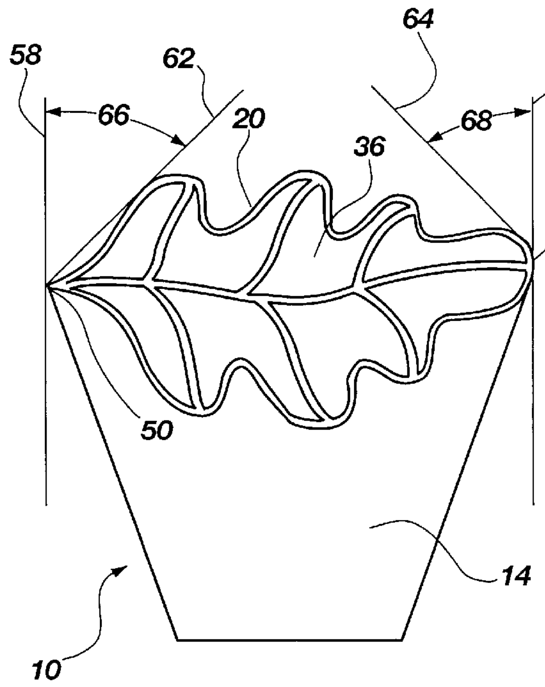
FIG. 6 illustrates a bottom plain view of one embodiment of the stamp of the present invention that includes a pattern resembling a leaf
Figure 7:
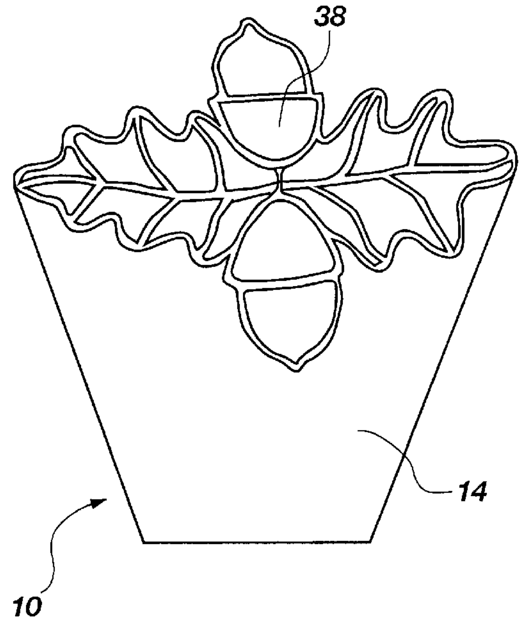
FIG. 7 illustrates a bottom plain view of one embodiment of the stamp of the present invention that includes a pattern having the shape of a diamond.

FIG. 6 illustrates a decorative design pattern 36 that resembles a leaf FIG. 7 illustrates an even more intricate pattern 38 that resembles two leafs and two acorns. These leaf patterns 36 and 38 have a naturist appeal and may be more appropriate for enhancing the appearance of concrete surface that is outdoors such as a patio or walkway, particularly if they are surrounded by trees. As should be evident, the ridge 20 can be formed into many desirable shapes. The imprints formed by patterns 36 and 38 can also be enhanced with a color stain or a contrasting aggregate surface.

Figure 8:
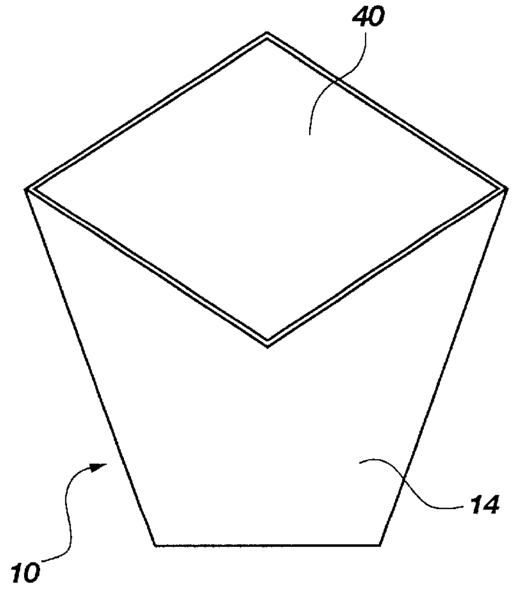
FIG. 8 illustrates a bottom plain view of one embodiment of the stamp of the present invention that includes a pattern having a shape resembling two leaves and two acorns.
Figure 9:
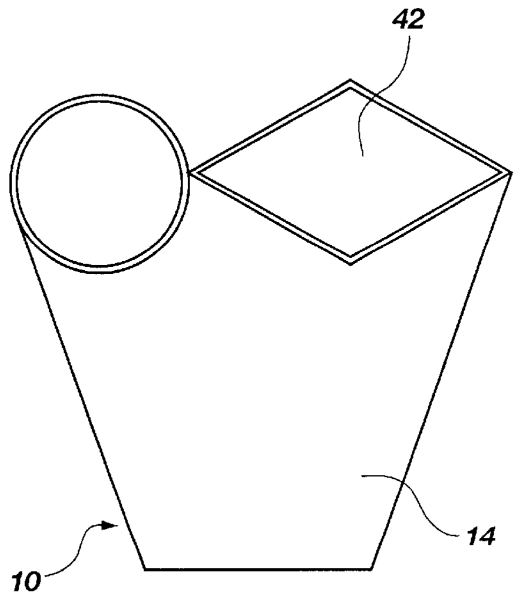
FIG. 9 illustrates a bottom plain view of one embodiment of the stamp of the present invention that includes a pattern having the shape of a circle and a diamond.

FIG. 8 shows a simple geometric pattern 40 that is the shape of a diamond. FIG. 9 shows another geometric pattern 42 having the shape of a diamond abutting a circle. The patterns 40 and 42 are suitable for a variety of surfaces. For example, pattern 42 might be used to form a series of alternating circle and diamond imprints on a playground. And pattern 40 might be used to form a single inset diamond design on a doorstep. These examples provided should not be seen as limitations but only as illustrations.

Another embodiment of the stamp is illustrated in FIG. 4 and includes an additional pattern 44. In this embodiment, the additional pattern 44 has the general shape of a half-moon. However, it should be appreciated that the additional pattern 44 can be a variety of shapes and sizes provided, as with pattern 32, the additional pattern 44 is defined by a ridge 46. Ridge 46 preferably extends outwardly from the contact surface 14 in the same manner and distance as ridge 20. In another embodiment, the stamp 10 has more than one additional pattern 44.

In a preferred embodiment of the stamp 10 of the present invention, reference points 50 and 52 are positioned at the outermost latitudinal reaches of the ridge 20. Reference point 50 is located on one side 54 of the stamp 10 and reference point 56 is located on the other side 56 of the stamp. Each reference point 50 and 52 has the same longitudinal position on their respective sides 54 and 56 of the stamp 10. Reference points 50 and 52 are useful for selecting stamp placement when forming a recess 70, as will be described hereafter.

Also shown in FIGS. 4 and 6 are lines 62 and 64. These lines 62 and 64 intersect reference points 50 and 52 respectively and extend tangent to the exterior portions of the pattern 32 and 36. Additional lines 58 and 60 are defined as longitudinal lines that extend through the corresponding reference points 50 and 52. Angle 66 is the angle between line 58 and line 62. Angle 68 is the angle between line 60 and 64.

One unique characteristic of this invention is that it allows the placement of stamp 10 to be variably selected from a range of possible stamp placements. For example, stamp 10 can be rotated about reference point 50 through angle 66, until line 62 becomes collinear with line 58. Stamp 10 can also be rotated about reference point 52 through angle 68 until line 64 becomes collinear with line 60. In this manner, Stamp 10 can form any recess within this range of rotation without interfering with an adjacent stamp 10 or previously formed imprint. The available range of rotation in this current embodiment is defined by angles 66 and 68.

This is a unique characteristic of the present invention because it allows stamp 10 to form a design imprint that is horizontally and vertically out of alignment with an adjacent design imprint within the range of rotation while preserving the integrity of the overall design scheme. One of skill in the art should appreciate that this is an improvement over the prior art. In particular, traditional shaping tools that are used to form repeating and adjacent pattern imprints require specific horizontal and vertical alignment. Without such alignment, the imprints will either be incomplete or overlap. This principle will become more apparent as it is further explained and illustrated throughout.

Figure 10:
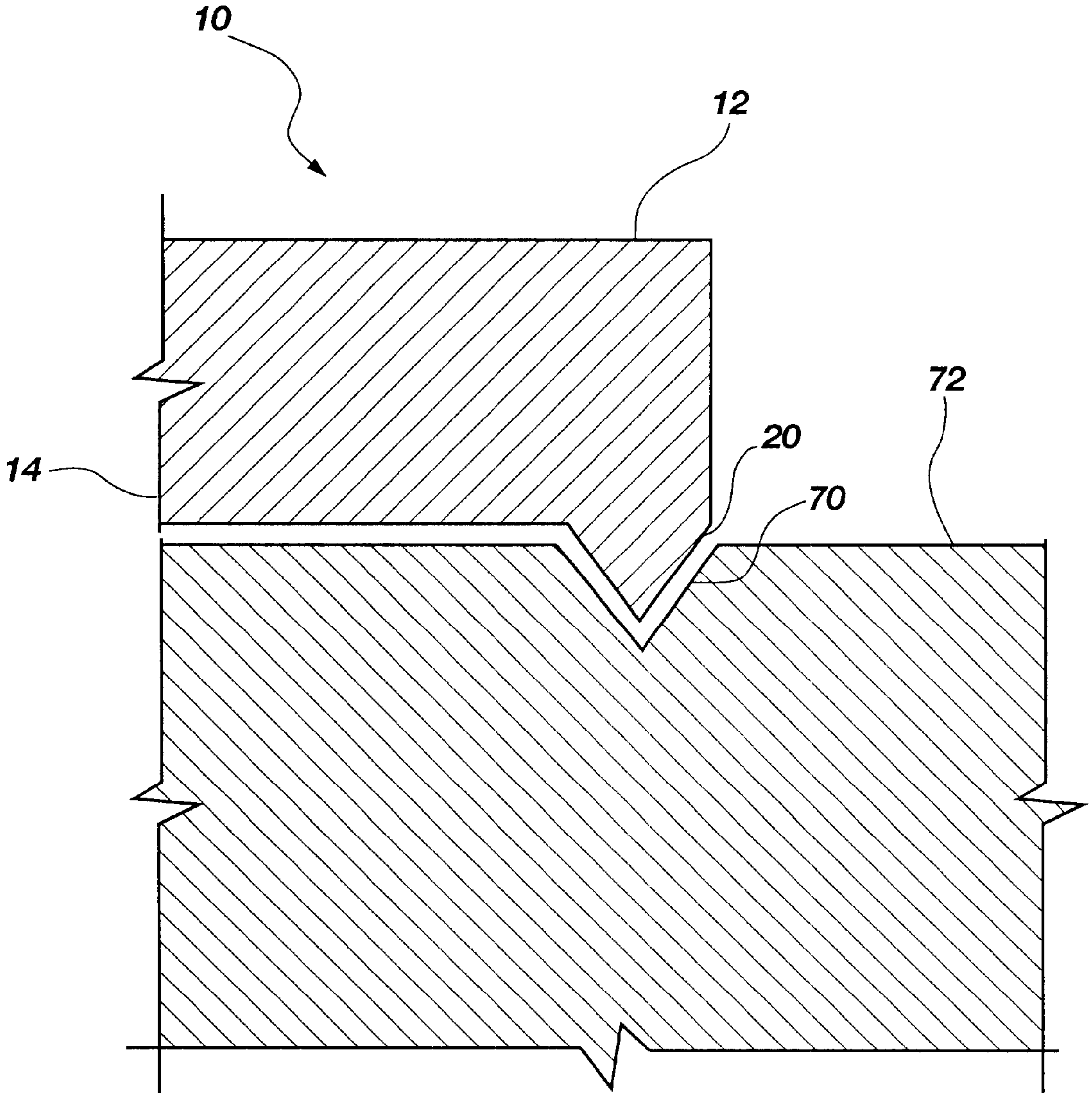
FIG. 10 illustrates a cross-sectional view of one presently preferred embodiment of the stamp of the present invention engaging a concrete surface to form a recess.

FIG. 10 shows a cross-sectional view of the stamp 10 and the ridge 20. As illustrated in this embodiment, the ridge 20 extends outwardly from the contact surface 14. The shape and size of the ridge 20 may vary and will determine the size and shape of the recess 70 to be formed therefrom. For example, the ridge 20 may be angular, square, beveled, rounded, large or small to create different design effects. In a preferred embodiment the ridge 20 is approximately three eighths of an inch wide and extends approximately one quarter of an inch from the contact surface 14. Although the size and shape of the ridge 20 have some effect on the displacement of concrete when a recess 70 is formed, the primary factor is determined by the curing stage of the concrete surface 72.

Figure 11:
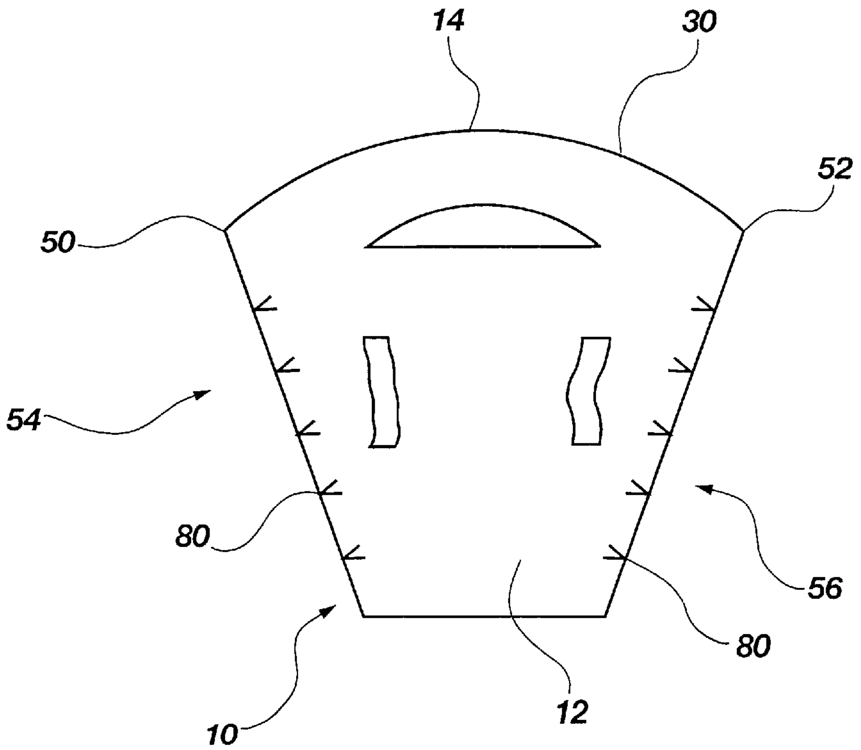
FIG. 11 illustrates a top view of one presently preferred embodiment of the stamp of the present invention that includes measurement markings and reference points.

FIG. 11 shows one presently preferred embodiment of the stamp 10 that includes measurement markings 80. It is important that the measurement markings 80 on one side 54 of the stamp 10 are longitudinally aligned with the measurement markings 80 on the other side 56 of the stamp. Measurement markings 80 are preferably imprinted on the top of frame 12 along both sides 54 and 56 of the stamp 10 and spaced apart every two inches. The quantity, spacing and form of measurement markings 80 on the stamp 10 can vary to satisfy different aesthetic and functional requirements. In one embodiment the measurement markings are v-shaped imprints on the surface of the frame 12 with the point of the v-shaped imprint being adjacent and perpendicular to the sides 54 and 56 of the frame 12.

In another embodiment, the measurement markings 80 are formed into the frame 12 at the time of manufacture by casting the frame 12 in a mold that can form measurement markings 80. It should be appreciated that the measurement markings 60 can be any markings, indentations, protrusions, or other reference that is used for measuring.

The primary purpose of the measurement markings 80 is to facilitate stamp placement by selectively gauging the distance the stamp 10 is placed from a desired border or reference of any type. This feature allows the stamp 10 to form customized designs of uniform or varying size. This is particularly useful for forming customized borders along a radius or an edge of an area having an irregular shape. The measurement markings 80 are also useful for aligning two adjacent stamps 10 by aligning the measurement markings 60 of the stamps 10.

According to one presently preferred method of the present invention, the stamp 10 is used to form a recess 70 in a concrete surface 72 as illustrated in FIG. 10. The recess 70 can be an independent design or a partial perimeter of a design. As illustrated in FIG. 10, this method involves the step of placing the stamp 10 in contact with the concrete surface 72 so that the contact surface 14 is substantially planar with the concrete surface 72. By doing this, the ridge penetrates the concrete surface 72. It is also preferred that the concrete surface 72 is sufficiently hardened when this step is performed.

Sufficiently hardened is a term of art in the industry and refers to the stage of curing concrete when the concrete is both malleable yet stiff enough to retain its shape. A recess 70 can be formed in concrete that is sufficiently hardened without significantly affecting the surface of the concrete around the recess 70. However, if the concrete is cured beyond the stage of being sufficiently hardened, then the concrete deflected from the recess 70 will cause the surface 72 of the concrete adjacent to the recess 70 to bulge and buckle. In the alternative, if the concrete is insufficiently cured, the recess formed will not keep its shape unless the void of the recess 70 is maintained by another object until the concrete becomes sufficiently hardened.

Because concrete that is sufficiently hardened will retain its shape, it is necessary to apply a force in order to deform the concrete. Again referring to FIG. 10, a recess 70 is formed when an appropriate force is applied to stamp 10. An appropriate force is any force that is sufficient to drive ridge 20 into the concrete, but not so great as to drive contact surface 14 beyond the plane of the concrete surface 72.

If this presently preferred method is used to form a recess 70 in the surface 72 of sufficiently hardened concrete then the contact surface 14 will not alter the generally flat surface of the concrete 72. However, if the concrete surface 72 is cured beyond the stage of being sufficiently hardened then the contact surface 14 may deflect concrete that is displaced by the penetration of the ridge 20.

The appropriate force required to drive the ridge 20 into the concrete surface 72 can be applied in any manner known to one skilled in the art. Typically, the force is applied with a rubber mallet by striking the portions of the frame 12 that are directly above the ridge 20. It should be appreciated that any type of object or weight can be used if it provides an appropriate force.

When the ridge 20 penetrates the concrete surface 72, recess 70 is formed in the image of the pattern 30. If the stamp 10 comprises an additional pattern 44 then an additional recess will be formed in the image of the additional pattern 44 in the same manner.

Figure 12:
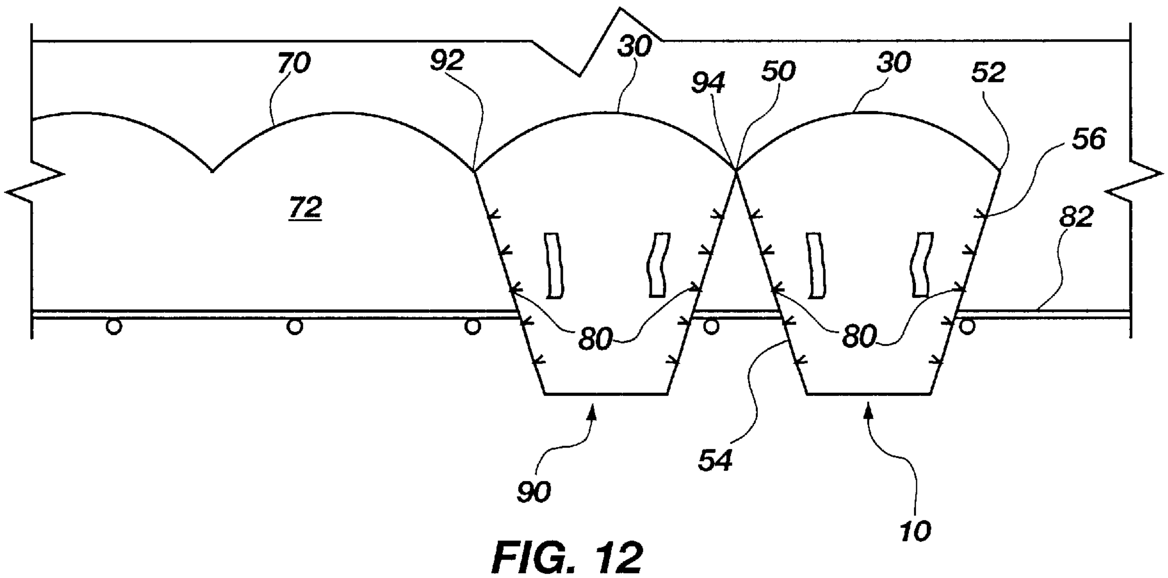
FIG. 12 illustrates one presently preferred method of the present invention that includes forming a recess along the straight edge of a concrete surface by positioning two stamps adjacently.

FIG. 12 shows one presently preferred method of using the stamp 10 of the current invention for forming a recess 70 along a straight edge 82 of a concrete surface 72. In this method, stamp 10 is placed adjacent to stamp 90. As illustrated, stamp 90 is substantially identical to stamp 10. However, in other embodiments, stamp 90 may have a different pattern 30 than that of stamp 10.

As shown in FIG. 12, reference point 50 of stamp 10 is aligned with the alternate reference point 94 of stamp 90. Because of this alignment, the recess 70 formed by the stamps 10 and 90 is connected and continuous. The length of the continuous recess 50 can be extended by moving stamp 90 from the one side 54 of stamp 10 to the other side 56 of stamp 10 and by aligning reference point 92 with reference point 52 and by aligning measurement markings 80 with the edge 82 of the concrete.

Figure 13:
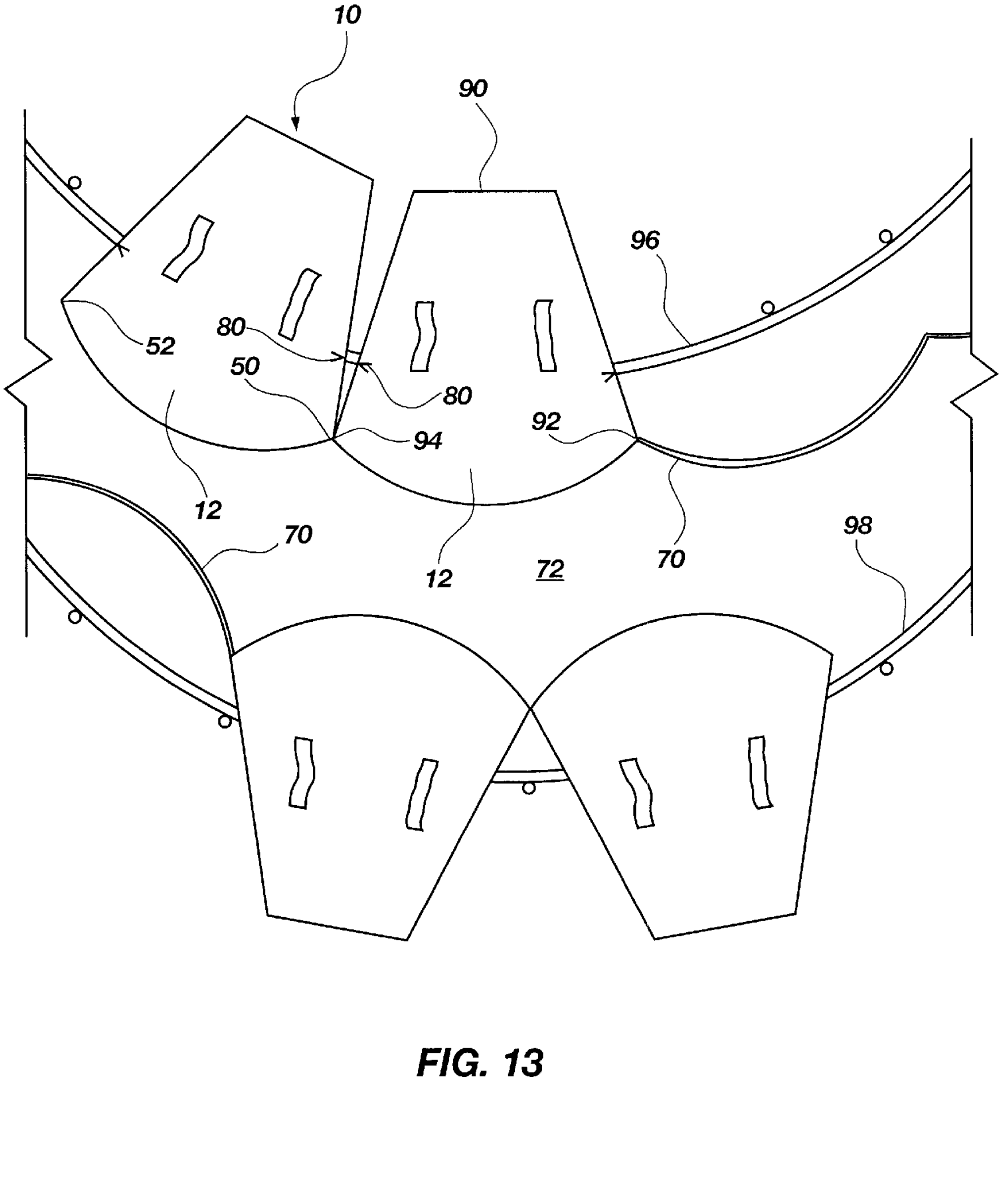
FIG. 13 illustrates one presently preferred method of forming a recess along an internal and external radius of a concrete surface that includes positioning two stamps adjacently.

FIG. 13 illustrates another application of the presently preferred method for forming a continuous recess in a concrete surface 72. In this application, the presently preferred method just described is used to form a continuous recess 70 along an internal radius 96 and external radius 98 such as might be found in a curved sidewalk. The application of this method along an internal radius 96 illustrates the usefultness of having a substantially trapezoidal frame 12. As shown, stamp 10 is adjoined to stamp 90 along an internal radius 96 and aligned by reference points 50 and 94. Measurement markings 80 are also aligned with the internal radius 96 so that the recesses formed from each stamp placement will be the same distance from the internal radius 96.

It should be apparent, with continued reference to FIG. 13, that the generally trapezoidal shape of frame 12 allows stamp 10 to be placed adjacent to stamp 90 along the internal radius 96 without the frame 12 of stamp 10 overlapping or interfering with the frame 12 of stamp 90. It should be appreciated that this would not be possible using a substantially square frame 12.

Figure 14:
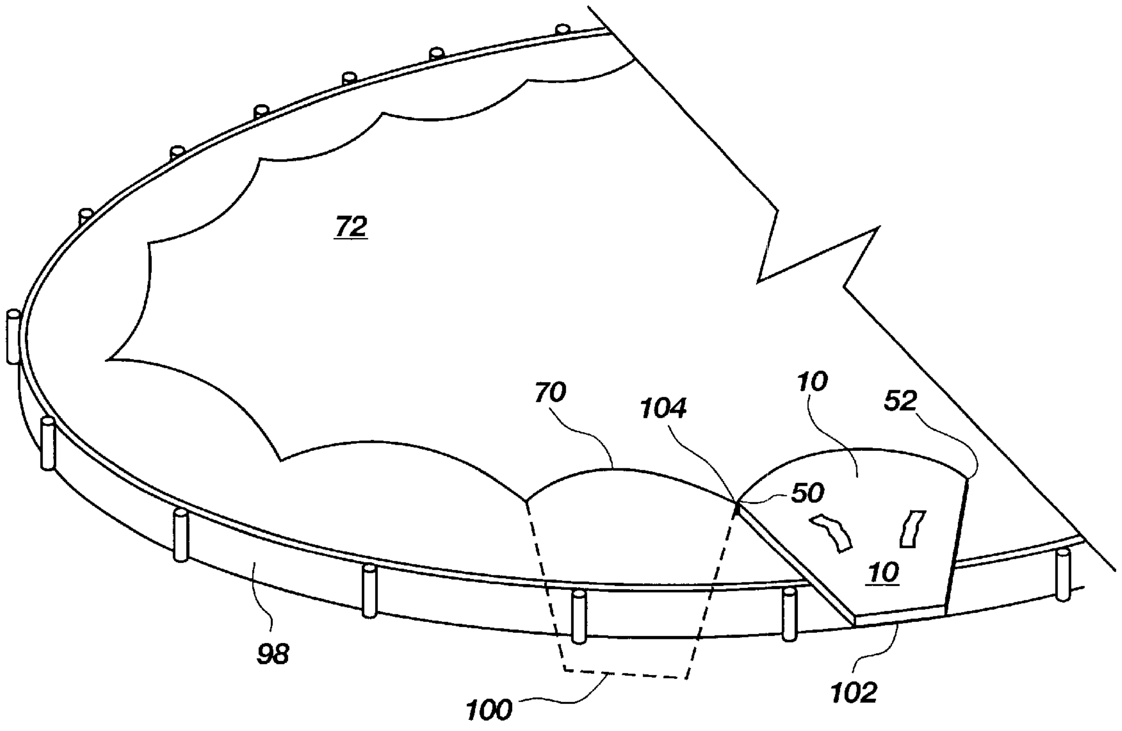
FIG. 14 illustrates one presently preferred method of forming a recess in a concrete surface that includes placing a stamp adjacent to a previous stamp placement.

FIG. 14 shows another method for forming a continuous recess 70 in a concrete surface. As illustrated in FIG. 14, a single stamp 10 is being used to form a design perimeter defined by recess 70 along an external radius 98. This method requires the stamp 10 to first be positioned in a first placement 100 where it is used to form a recess 70. The stamp 10 is then removed from the concrete surface 72 and positioned in a second placement 102. The second placement 102 is selected by aligning reference points 50 and 104. Reference point 104 is defined as the location occupied by reference point 52 during the first placement. A second recess is then formed by applying an appropriate force to the stamp 10 in the second placement 102. This process can be repeated until the design perimeter is completed.

Figure 15:
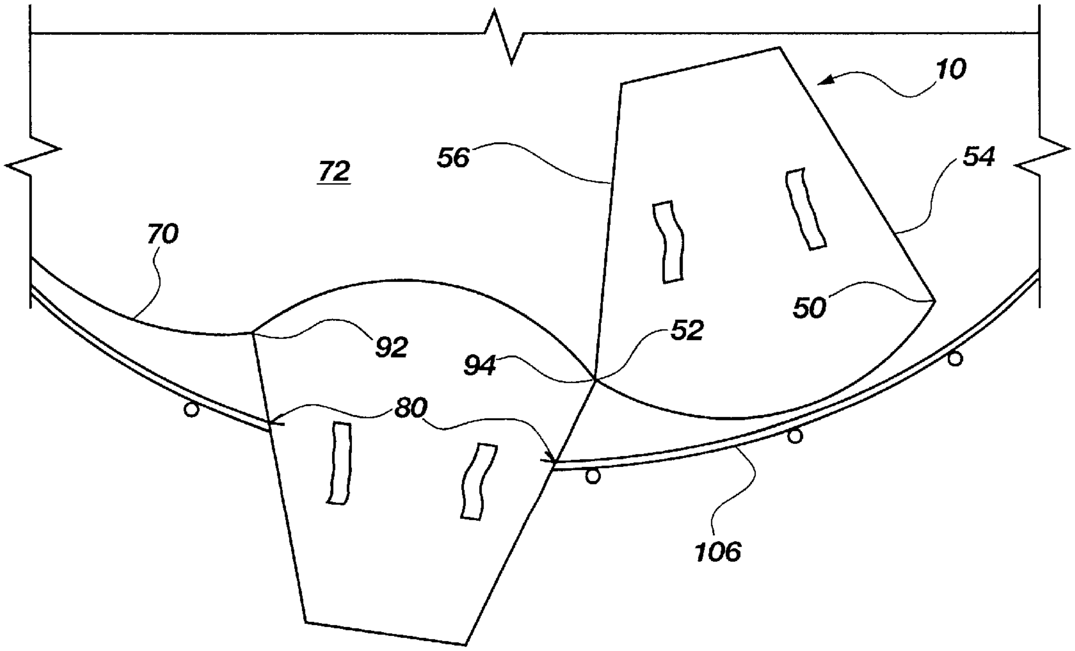
FIG. 15 illustrates one presently preferred method of forming a recess in a concrete surface that includes using two adjacent stamps that face opposite directions.

FIG. 15 shows yet another method for forming a continuous recess in a concrete surface. In this method, stamp 10 and stamp 90 face opposite directions and are adjoined by reference points 52 and 94. In practicing this method, stamp 90 is placed on the concrete surface so that measurement markings 80 are aligned with the edge 106 of the concrete. Next, stamp 10 is placed on the concrete surface facing the opposite direction of stamp 90 so that reference point 52 adjoins reference point 94. The placement of stamp 10 in this embodiment is such that reference points 50 and 94 are positioned an equal distance from the edge 106. The length of the continuous recess 70 can be extended by moving stamp 90 from the one side 56 of stamp 10 to the other side 54 of stamp 10 and by aligning reference point 92 with reference point 50 and by aligning measurement markings 80 with the edge 106 of the concrete.

Figure 16:
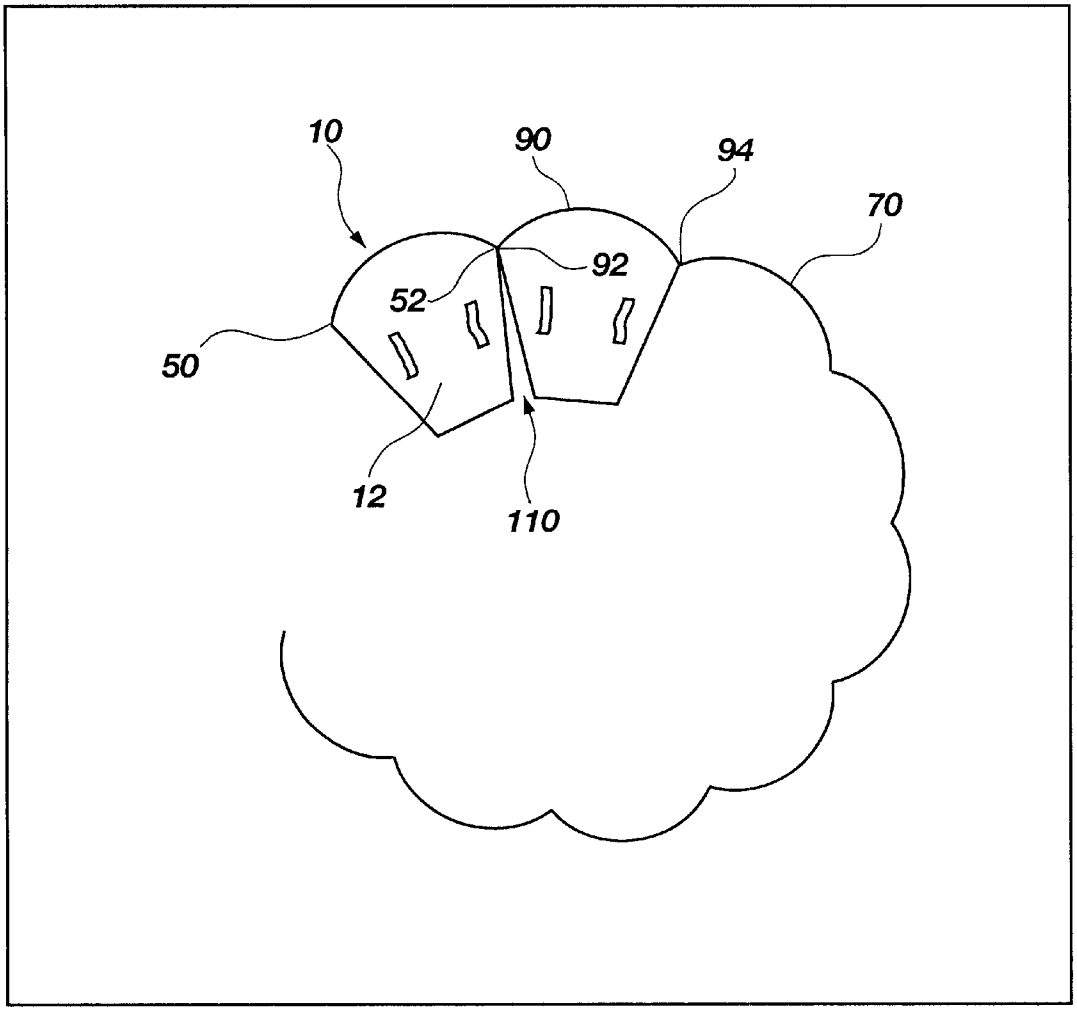
FIG. 16 illustrates two presently preferred embodiments of the stamp forming an inset design in a concrete surface.

FIG. 16 illustrates a presently preferred method for forming an inset design with the stamp 10 of the present invention. In this embodiment stamp placements are positioned within the design area. However, it should be noted that inset designs can also be formed with stamp placements positioned outside of the design area. Stamp placement is discretionary and is determined by the shape and size of the desired design.

One unique feature of the present invention is that it allows the size and shape of the inset design to be variably selectable. In FIG. 16, reference point 52 of stamp 10 is aligned with reference point 92 of stamp 90. To enlarge the design perimeter that is defined by the recess 70, stamp 10 will be rotated about reference point 52 in a clockwise direction, enlarging gap 110 To form a smaller design perimeter, stamp 10 is rotated about reference point 52, in a counterclockwise direction, narrowing gap 110. This range of motion is possible because of the generally trapezoidal shape of the frame 14. It should be appreciated that this range of motion can be increased by using a frame that has a substantially triangular shape.

Figure 17:
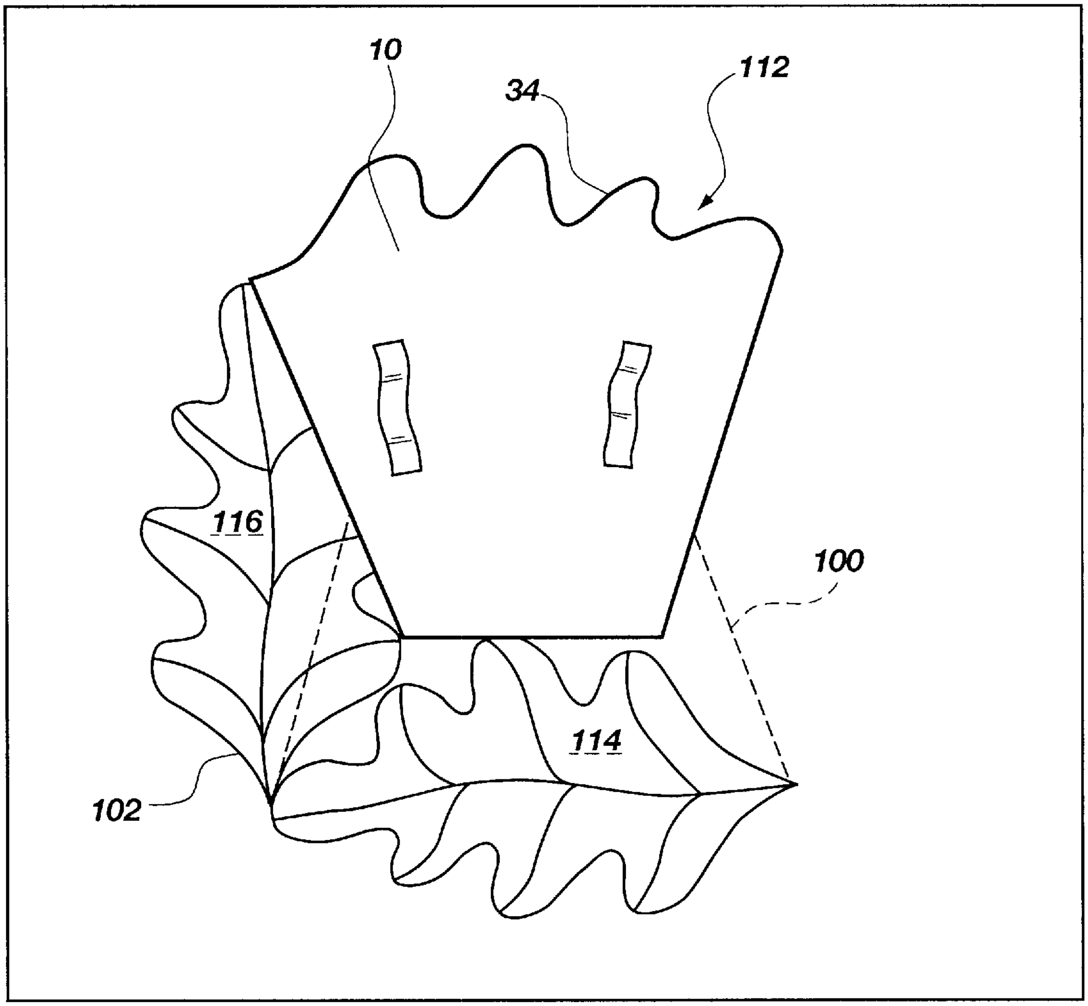
FIG. 17 illustrates one presently preferred embodiment of the stamp that has a leaf pattern forming an inset design in a concrete surface.

FIG. 17 illustrates a very small inset design being formed with a single stamp 10 that has a pattern 34 resembling a leaf As shown, the placement 112 of the stamp 10 overlaps the location of previous stamp placements 100 and 102 that were used to form the design imprints 114 and 116 without interfering with the design imprints 114 and 116. It should be appreciated that this would not be possible with a traditional surface shaping tool because the pattern imprints formed with a traditional surface shaping tool would overlap.

Figure 18:
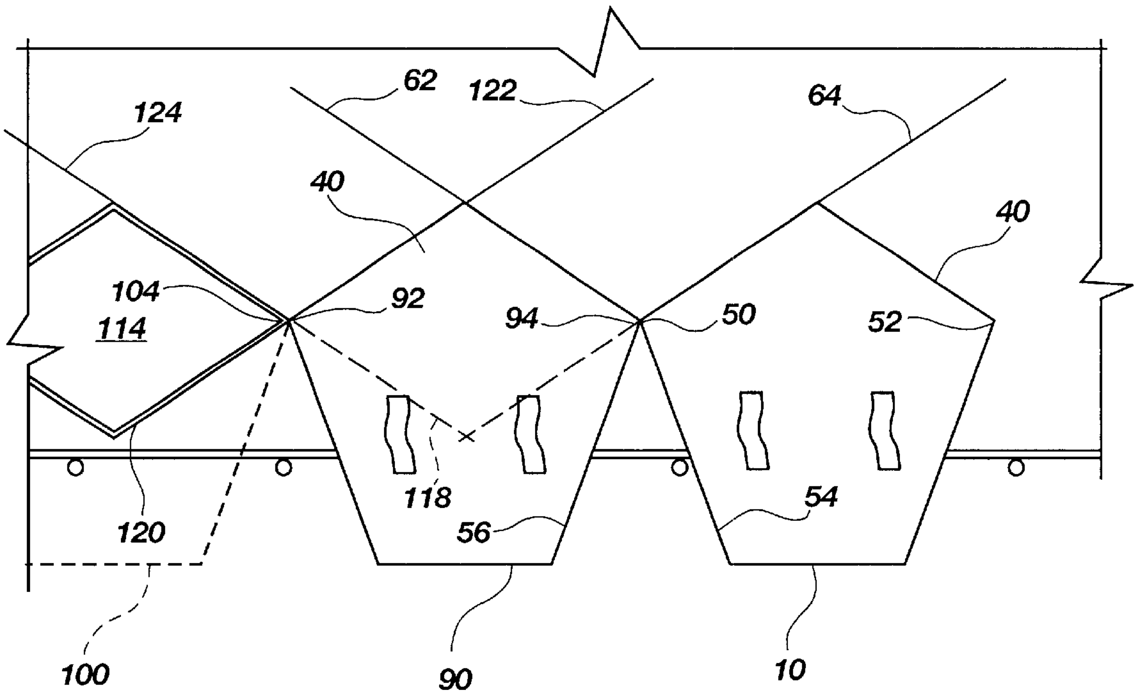
FIG. 18 illustrates one presently preferred method of selecting the placement for the presently preferred embodiment of the stamp of the present invention.

FIG. 18 illustrates various methods for selecting the placement of the stamp of the current invention. In one presently preferred method, stamp 10 is adjoined with an adjacent stamp 90 by aligning reference point 50 with reference point 94. The placement of the stamp 10 is selected by rotating the stamp 10 about reference point 50 in either a clockwise direction or a counterclockwise direction. In this presently preferred method, the range of rotation in the clockwise direction is determined by rotating the stamp 10 in a clockwise direction until the side 54 of the stamp 10 abuts the side 56 of the adjacent stamp 90.

The range of rotation in the counterclockwise direction is determined by rotating the stamp 10 in a counterclockwise direction until the line 64 becomes collinear with the line 62. The line 64 and the line 62 are tangent lines to the exterior portions of the pattern 40 for each of the stamps 10 and 90 respectively. As should be apparent to one of skill in the art, this method of placing the stamp 10 is an improvement over prior art that requires fixed tool alignment and does not allow tool placement to be variably selectable by rotating the tool out of angular alignment with an adjacent tool. This range of rotation for selecting stamp placement is a unique feature of the present invention and provides the stamp 10 with greater versatility than traditional shaping tools.

Another method for selecting stamp placement provides an even greater range of rotation in the clockwise direction. In this method, stamp 90 is placed adjacent to a previous stamp placement 100 with reference point 92 being aligned with reference point 104. The placement of the stamp 90 can then be selected by rotating the stamp 90 about reference point 92 in either a clockwise direction or a counter clockwise direction. The range of rotation in the clockwise direction is determined by rotating the stamp 90 until the line 118 becomes collinear with the reference line 120. The line 118 is a tangent line to the pattern 40 of the stamp 90. The reference line 120 is a tangent line to the pattern imprint 114 formed from the previous stamp placement 100. It should be apparent that when the line 118 is collinear with the reference line 120 the placement of the stamp 90 overlaps the previous stamp placement 100. This versatility in selecting tool placements is an improvement over the prior art that teaches away from this. Practicing this method with traditional shaping tools would result in overlapping pattern imprints.

The range of rotation of the stamp 90 in the counterclockwise direction for this presently preferred method is determined by rotating the stamp in a counterclockwise direction until the line 122 becomes collinear with the reference line 124. The line 122 is a tangent line to the pattern 40 of the stamp 90. The reference line 124 is a tangent line to the pattern imprint 114 formed from the previous stamp placement 100.

The present invention referred to throughout as the stamp may be embodied in other specific forms without departing from its spirit or essential characteristics. The described embodiments are to be considered in all respects only as illustrative and not restrictive. Furthermore, each of the methods that have been described should also be considered only as illustrative and not restrictive. In particular, it should be appreciated that the present invention can be used to form various designs in various deformable materials including, but not limited to plaster and asphalt.

What is claimed is:

1. A stamp for forming a customized design of one or more design imprints in a generally flat surface of a deformable material, comprising:

a frame having a contact surface for engaging the surface of the deformable material, said contact surface being smooth so as to not shape the surface of the deformable material;

a ridge extending outwardly from the contact surface of said frame, said ridge positioned along said surface of said frame from a first reference point to a second reference point to define a pattern therebetween, such that said recess is configured to form a design imprint in the surface of the deformable material when the stamp is positioned in a stamp placement on the deformable material; and the contact surface and the ridge being configured on the frame to allow the stamp to be positioned in at least two stamp placements that overlap and that are angularly offset, and in such a manner that the design imprints formed in the deformable material by the two or more stamp placements do not interfere.

2. A stamp as recited in claim 1, wherein the shape of the frame is substantially trapezoidal.

3. A stamp for forming a recess in a generally flat surface of a deformable material as in claim 1, wherein said smooth contact surface allows the stamp to be positioned in a first placement and a second placement, the second placement overlapping the location of the first placement, but wherein the location of the pattern in the second placement does not overlap the location of the pattern in the first placement.

4. A stamp as recited in claim 1, wherein said first or second reference point of the stamp, while the stamp is positioned in the first placement, is aligned with an alternate one of said first or second reference point while the stamp is positioned in the second placement.

5. A stamp as in claim 1, wherein said contact surface and said ridge are made of rubber.

6. A stamp as recited in claim 1, further comprising one or more measurement markings imprinted on said frame, the one or more measurement markings formed in the stamp being configured for measuring a distance the ridge of the stamp is placed from an identifiable boundary.

7. A stamp as in claim 1, further comprising at least one handle.

8. A stamp as recited in claim 1, further comprising at least one additional pattern, said at least one additional pattern comprising an additional ridge extending outwardly from the contact surface.

9. A stamp as in claim 1, wherein said ridge is angular.

10. A stamp as in claim 1, wherein said ridge is curvilinear.

11. A stamp as in claim 1, wherein said pattern is a decorative design.

12. A stamp as in claim 1, wherein said frame has a substantially triangular shape.

13. A stamp as recited in claim 7, wherein the at least one handle consists of a nylon strap.

14. A stamp for forming a customized design of one or more design imprints in a generally flat concrete surface, comprising:

a trapezoidal frame having a contact surface for engaging the surface of the deformable material, said contact surface being smooth so as to not shape the surface of the deformable material;

one or more measurement markings formed in the stamp, the measurement markings being configured for measuring a distance the ridge of the stamp is placed from an identifiable boundary; and a ridge extending outwardly from the contact surface of said frame, said ridge being positioned along said surface of said frame from a first reference point to a second reference point and defining a pattern therebetween, such that said recess is configured to form a design imprint in the surface of the deformable material when the stamp is positioned in a stamp placement on the deformable material;

said first and second reference points of said ridge being positioned at the same longitudinal position on a first and second side of side frame respectively and being located at the outermost latitudinal reaches of said ridge;

said contact surface and ridge being configured to allow the stamp to be positioned in a first placement and a second placement, the second placement overlapping a location of the first placement, but wherein a location of the pattern while the stamp is in the second placement does not overlap a location of the pattern while the stamp is in the first placement, and wherein one of the first and second reference points of the stamp, while the stamp is in the first placement, is aligned with one of the first and second reference points of the stamp, while the stamp is in the second placement, and such that first and second design imprints formed by the stamp while in the first and second placements do not interfere.

15. A stamp as in claim 14, wherein lines from each of said reference points extend tangent to the exterior portions of the pattern, thereby allowing rotation of the frame about one of the reference points until one of said lines becomes collinear with a reference line, said reference line extending from said first or second reference point and being tangent to the pattern of an adjacent stamp or previous stamp placement.

16. A stamp as recited in claim 14, wherein the shape of the said frame is substantially trapezoidal.

17. A stamp as recited in claim 14, wherein said first or second reference point of the stamp, while the stamp is positioned in the first placement, is aligned with an alternate one of said first or second reference point while the stamp is positioned in the second placement.

18. A stamp as in claim 14, wherein said surface and said ridge consist of rubber.

19. A stamp as recited in claim 14, further comprising at least one additional pattern, said at least one additional pattern comprising an additional ridge that extends outwardly from the contact surface.

20. A stamp as in claim 14, wherein said ridge is angular.

21. A stamp as in claim 14, wherein said ridge is curvilinear.

22. A stamp as in claim 14, wherein said pattern is a decorative design.

23. A stamp as in claim 14, further including at least one handle comprising a nylon strap.

24. A stamp as recited in claim 1, wherein said deformable material includes concrete.

25. A stamp as recited in claim 1, wherein the at least two stamp placements are angularly offset by an angle of less than 90 degrees.

26. A stamp as recited in claim 1, wherein the contact surface and the ridge are further configured on the frame to allow the stamp to be positioned in at least two stamp placements that overlap and that are angularly offset by a plurality of different angles, and in such a manner that the design imprints formed in the deformable material by the two or more stamp placements do not interfere.

* * * * *